UNITED STATES PATENT OFFICE.

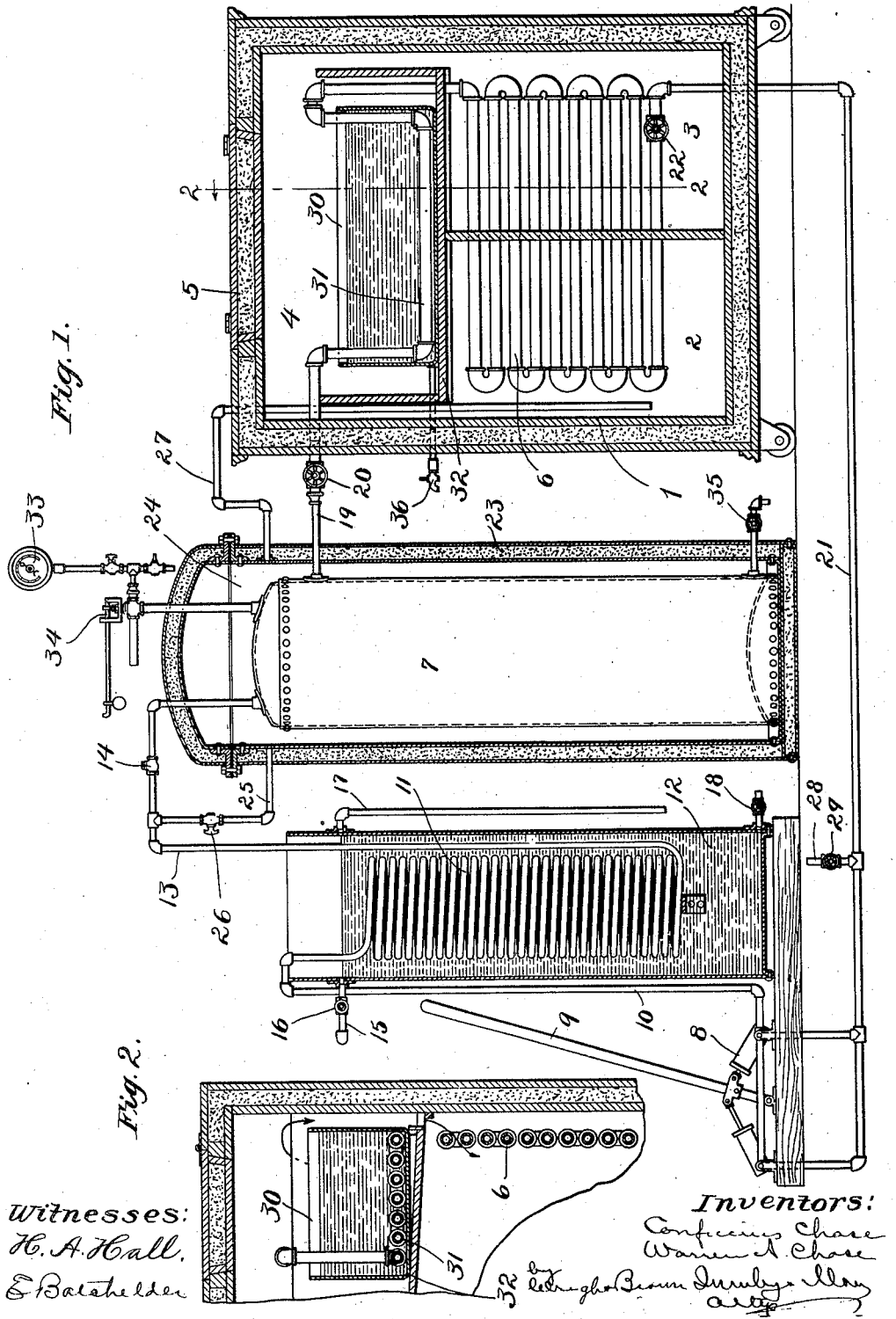

CONFUCIUS CHASE AND WARREN A. CHASE, OF BOSTON, MASSACHUSETTS, ASSIGNORS TO WILLARD E. ROBINSON, OF WINCHESTER, MASSACHUSETTS.

REFRIGERATING APPARATUS.

1,088,206.  Specification of Letters Patent.  Patented Feb. 24, 1914.

Application filed October 7, 1907. Serial No. 396,207.

*To all whom it may concern:*

Be it known that we, CONFUCIUS CHASE and WARREN A. CHASE, of Boston, in the county of Suffolk and State of Massachusetts, have invented certain new and useful Improvements in Refrigerating Apparatus, of which the following is a specification.

This invention relates to a cooling or refrigerating apparatus adapted especially to domestic use, by which perishable goods may be preserved without the use of ice.

The invention consists in an apparatus which produces a low temperature by the expansion of previously-compressed, cool and condensed elastic refrigerating fluid.

The object of the invention is to increase the efficiency of an apparatus of this character, to simplify its construction, and to make provisions for avoiding ill effects in case the apparatus should get out of order or its operation should be suspended temporarily or for any other reason.

The details of the apparatus and means by which we accomplish our object are fully described and claimed in the accompanying drawings, in which,—

Figure 1 represents a sectional view of the essential parts of an apparatus embodying the invention. Fig. 2 represents a fragmentary cross section of the refrigerator or preserving box, taken on line 2—2 of Fig. 1.

The same reference characters indicate the same parts in both figures.

Referring to the drawings, 1 represents a refrigerator, preferably such as is ordinarily employed for domestic use, having chambers 2 and 3 for reception of articles of food to be preserved, and a space 4 in its upper part corresponding to the ice-chest of the usual refrigerator. The top of the upper chamber is closed by a trap door 5, through which ice may be placed in the chamber, if necessary.

Our invention includes the combination with a domestic refrigerator, of a mechanical refrigerating apparatus by which elastic or volatile refrigerating fluid may be compressed, condensed, and caused to expand in a set of cooling pipes within the refrigerator. The cooling pipes are represented at 6, and shown as a coil or a nest of piping in vertical series against one of the interior walls of the refrigerator. A great enough length of piping is provided to give sufficient superficial area for absorption of heat and condensation of moisture from the air contained within the refrigerating chamber.

Preferably the cooling agent is contained in a tank 7 under pressure furnished by a pump 8. This pump is shown as a hand-operated one, having a lever or handle 9, although we do not limit ourselves to any particular type or character of pump, but include within our invention any sort of pump operated by any convenient motive power. We may employ as the refrigerant any elastic or volatile fluid suitable for the purpose.

From the pump the refrigerant flows through a tube 10 into a condensing coil 11 contained in a tank 12, and from the coil through a connection 13 past a check valve 14 to the tank 7. Cooling water is admitted to the condenser tank 12 from a pipe 15 controlled by a valve 16, and escapes through an overflow outlet 17, which is at a height sufficient to bring the water-level above the top of the coil. The cold flowing water in the tank carries the heat of compression from the refrigerant contained in the coil and reduces the temperature thereof to approximately that of the water. This temperature is kept by the refrigerant under pressure stored in the tank 7. An outlet 18 is provided at the bottom of the condenser tank for drawing off the water whenever necessary.

From the tank 7 a connection 19 leads to the cooling pipe coil 6, and between this connection and coil is a valve 20 for regulating the rate of flow of the compressed refrigerant to the coil. When a sufficiently low pressure is maintained in the coil 6, and refrigerant under pressure from the tank 7 is allowed to escape past the valve in a fine stream, opportunity for a great degree of expansion of the fluid is afforded, and in consequence, the temperature of the coil becomes lowered to a degree sufficient for the purposes of refrigeration.

In order to maintain a low pressure in the coil a connection 21 is provided between the outlet of the latter and the intake of the pump 8, so that the pump draws its supply of fluid from the coil. Thus the pump serves the double purpose of providing a pressure in the circulating fluid and maintaining a partial vacuum, or at least, a sufficiently low pressure in the coil 6 to permit the desired amount of fall in temperature to take place therein. A valve 22 controls the outlet from the coil.

Surrounding the storage tank 7 is a jacket consisting of a double-walled and insulated tank 23 of sufficient size to provide an internal chamber 24 entirely surrounding the tank. Into this chamber opens a by-pass 25 from the connection 13, which is controlled by a stop-cock or valve 26. This valve may be opened more or less to admit a stream of compressed fluid from the pipe 13 at a rate permitting it to expand and chill the jacket, by which means the temperature of fluid in the tank may be still further reduced. A pipe 27 may be used when desired to carry away the jacket fluid, when such fluid is of a nature suitable for the purposes hereinafter named and to conduct it to the interior of the refrigerator. This pipe may be used as a washing or clearing device for displacing warm air from the interior of the refrigerator when the refrigerating system is first put into operation, and for clearing the refrigerator of tainted air from time to time thereafter. There need not be constant flow of refrigerating fluid through the jacket 24 and pipe 27, but such a flow occurs only when the cock 26 is opened.

In the connection 21 between the outlet of the coil 6 and the intake of the pump is a valve 29 connecting with pipe 28 adapted to admit the refrigerant. This valve is opened when the apparatus is first put into operation, in order to obtain a sufficient supply of refrigerant to furnish the desired degree of compression, and may be opened from time to time thereafter to make up deficiencies in the supply, or to provide for a greater pressure if desired. Normally, however, the valve is kept closed, so that in the ordinary course of operation there is neither loss nor admission of the refrigerant. Thus the refrigerant travels in a closed cycle and a pressure may be maintained in the coil 6 less than that of the atmosphere.

In the chamber 4 of the refrigerator is a tank 30 containing brine or other liquid having a sufficiently low freezing point. A coil 31 of pipes forming part of the expansion pipe system 6 is immersed in the liquid in the tank, and serves to extract heat therefrom and chill the liquid. Enough heat may be abstracted from the liquid, according to the amount of expansion and lowering of temperature in the cooling pipe system, to enable the liquid to serve the same purpose of a block of ice, maintaining a low temperature in the refrigerator even if the operation of the apparatus is discontinued and the flow of refrigerant through the pipes ceases. This tank is supported on a shelf 32 between which and the walls of the refrigerator are spaces for circulation of air. The pressure in the storage tank 7 is indicated by a gage 33, while the relief valve 34 is provided to relieve the pressure when the same becomes too great. A purge valve 35 is provided in the bottom of the air storage tank 7, and a tap 36 provided for draining the tank 30 of water of condensation.

We claim:—

1. In combination with a refrigerator, a cooling pipe in said refrigerator, a fluid compressor, a storage tank into which a refrigerating fluid is forced under pressure by said compressor, a condenser through which the fluid flows in passing from the compressor into said tank, a connection between said tank and cooling pipe through which the fluid passes at a rate permitting it to expand in said pipe, a jacket surrounding said tank, a by-pass from the refrigerant pipe between the condenser and the jacket to said jacket for permitting an expansion of the fluid in the latter to cool the fluid in the tank, and an outlet from the jacket into the refrigerator through which the jacket fluid may pass to displace the warm or tainted air therein.

2. A refrigerating apparatus consisting of a preserving box or chamber for containing substances to be preserved, a coil of pipe therein, a tank adapted to contain fluid under pressure connected with said coil, a regulating valve permitting the fluid to pass in an expanded and cooled state into said coil, an insulated chamber surrounding said tank, an inlet to said chamber for the pressure fluid, and an outlet therefrom discharging into the preserving chamber, whereby the fluid is enabled to chill the tank and assist in cooling the preserving chamber.

3. A refrigerating apparatus for domestic use, consisting of a pump, a coiled pipe into and through which fluid under pressure is forced by said pump, a condenser in which said coiled pipe is contained and through which water is caused to flow, a pressure tank into which the compressed and condensed fluid is discharged from the coiled pipe, an insulating jacket inclosing said tank, a by-pass from the pipe opening into said jacket and permitting a restricted flow of fluid thereto, a preserving box or chamber, a pipe coil contained therein, a connection to said coil from the tank permitting a restricted flow of fluid thereto, a suction connection from the coil to the intake of the pump, and an outlet from said jacket discharging into said preserving chamber.

4. A refrigerating apparatus for domestic use, consisting of a pump, a coiled pipe into and through which fluid under pressure is forced by said pump, a condenser in which said coiled pipe is contained and through which water is caused to flow, a pressure tank into which the compressed and condensed fluid is discharged from the coiled pipe, an insulated jacket inclosing said tank, a by-pass from the pipe opening into said jacket and permitting a restricted flow of fluid thereto, a preserving box or chamber, a pipe coil contained therein, a connection to said coil from the tank permitting a restricted flow of fluid thereto, a suction connection from the coil to the intake of the pump, and a storage tank for liquid having a low freezing point in which part of said coil is contained and whereby it may be chilled to serve as a cooling agent when the apparatus is not in operation.

In testimony whereof we have affixed our signatures, in presence of two witnesses.

CONFUCIUS CHASE.
WARREN A. CHASE.

Witnesses:
ARTHUR H. BROWN,
EDWARD SEAM.